United States Patent
Ikenishi

(10) Patent No.: US 10,542,207 B2
(45) Date of Patent: Jan. 21, 2020

(54) IMAGE PROCESSING APPARATUS AND IMAGE PROCESSING METHOD

(71) Applicant: CANON KABUSHIKI KAISHA, Tokyo (JP)

(72) Inventor: Shunsuke Ikenishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 16/035,870

(22) Filed: Jul. 16, 2018

(65) Prior Publication Data
US 2019/0028639 A1 Jan. 24, 2019

(30) Foreign Application Priority Data
Jul. 20, 2017 (JP) .................... 2017-140586

(51) Int. Cl.
| | |
|---|---|
| *H04N 5/232* | (2006.01) |
| *G06K 9/20* | (2006.01) |
| *G06T 7/90* | (2017.01) |
| *H04N 1/60* | (2006.01) |
| *G06T 7/00* | (2017.01) |

(52) U.S. Cl.
CPC .......... *H04N 5/23229* (2013.01); *G06K 9/20* (2013.01); *G06T 7/90* (2017.01); *G06T 7/97* (2017.01); *H04N 1/6027* (2013.01); *H04N 5/23222* (2013.01)

(58) Field of Classification Search
CPC ............. H04N 5/23229; H04N 1/6027; H04N 5/23222; G06T 7/97; G06T 7/90; G06K 9/20
See application file for complete search history.

(56) References Cited

U.S. PATENT DOCUMENTS

| | | | |
|---|---|---|---|
| 9,602,709 B2 | 3/2017 | Kitajima | ............ H04N 5/23206 |
| 9,699,374 B2* | 7/2017 | Song | .................. H04N 5/23222 |
| 2014/0147090 A1* | 5/2014 | Kitajima | ................ H04N 5/772 |
| | | | 386/224 |
| 2014/0184825 A1* | 7/2014 | Kitajima | ............ G11B 27/3027 |
| | | | 348/207.1 |

FOREIGN PATENT DOCUMENTS

| | | |
|---|---|---|
| JP | 2004-264945 | 9/2004 |
| JP | 2014-107837 | 6/2014 |
| JP | 2014-131189 | 7/2014 |

* cited by examiner

*Primary Examiner* — Shahbaz Nazrul
(74) *Attorney, Agent, or Firm* — Venable LLP

(57) ABSTRACT

An image processing apparatus according to the present invention includes: an acquiring unit configured to acquire information on first image processing performed on input image data; a processing unit configured to generate processed image data by performing second image processing on the input image data; and an outputting unit configured to output the information on the first image processing acquired by the acquiring unit, information on the second image processing performed by the processing unit, and information regarding an order of execution of the first image processing and the second image processing either as a single piece of information or individual pieces of information, wherein the information on the first image processing and the information on the second image processing respectively include a parameter of a type defined in the ASC CDL.

12 Claims, 11 Drawing Sheets

FIG. 3A

| IMAGE PROCESSING ID | | 1 | | |
|---|---|---|---|---|
| PARAMETERS | R VALUE | slope=0.8 | offset=0.05 | power=0.9 |
| | G VALUE | slope=0.8 | offset=0.05 | power=0.9 |
| | B VALUE | slope=0.8 | offset=0.05 | power=0.9 |

FIG. 3B

| IMAGE PROCESSING ID | | 2 | | |
|---|---|---|---|---|
| PARAMETERS | R VALUE | slope=0.9 | offset=0 | power=1.4 |
| | G VALUE | slope=0.9 | offset=0 | power=1.4 |
| | B VALUE | slope=0.9 | offset=0 | power=1.4 |

FIG. 5A

| LIST OF IMAGE PROCESSING TO BE EXECUTED IN ADVANCE | FIRST | NONE | | |
|---|---|---|---|---|
| | SECOND | | | |
| | THIRD | | | |
| | FOURTH | | | |
| | FIFTH | | | |
| | ... | | | |
| IMAGE PROCESSING ID | | 1 | | |
| PARAMETERS | R VALUE | slope=0.8 | offset=0.05 | power=0.9 |
| | G VALUE | slope=0.8 | offset=0.05 | power=0.9 |
| | B VALUE | slope=0.8 | offset=0.05 | power=0.9 |

FIG. 5B

| LIST OF IMAGE PROCESSING TO BE EXECUTED IN ADVANCE | FIRST | 1 | | |
|---|---|---|---|---|
| | SECOND | | | |
| | THIRD | | | |
| | FOURTH | | | |
| | FIFTH | | | |
| | ... | | | |
| IMAGE PROCESSING ID | | 2 | | |
| PARAMETERS | R VALUE | slope=0.9 | offset=0 | power=1.4 |
| | G VALUE | slope=0.9 | offset=0 | power=1.4 |
| | B VALUE | slope=0.9 | offset=0 | power=1.4 |

FIG. 5C

| LIST OF IMAGE PROCESSING TO BE EXECUTED IN ADVANCE | FIRST | 1 | | |
|---|---|---|---|---|
| | SECOND | 2 | | |
| | THIRD | | | |
| | FOURTH | | | |
| | FIFTH | | | |
| | ... | | | |
| IMAGE PROCESSING ID | | 3 | | |
| PARAMETERS | R VALUE | slope=1 | offset=0 | power=1.2 |
| | G VALUE | slope=1 | offset=0 | power=1.2 |
| | B VALUE | slope=1 | offset=0 | power=1.2 |

FIG. 6A

| LIST OF IMAGE PROCESSING TO BE EXECUTED IN ADVANCE | FIRST | 1 |
|---|---|---|
| | SECOND | 2 |

FIG. 6B

| LIST OF IMAGE PROCESSING TO BE EXECUTED IN ADVANCE | FIRST | 1 |
|---|---|---|
| | SECOND | 2 |
| | THIRD | 3 |

*FIG. 10*

| IMAGE PROCESSING ID | | 1 | | |
|---|---|---|---|---|
| PARAMETERS | R VALUE | slope=0.8 | offset=0.05 | power=0.9 |
| | G VALUE | slope=0.8 | offset=0.05 | power=0.9 |
| | B VALUE | slope=0.8 | offset=0.05 | power=0.9 |
| IMAGE PROCESSING ID | | 2 | | |
| PARAMETERS | R VALUE | slope=0.9 | offset=0 | power=1.4 |
| | G VALUE | slope=0.9 | offset=0 | power=1.4 |
| | B VALUE | slope=0.9 | offset=0 | power=1.4 |

FIG. 11A

| INPUT VALUE | OUTPUT VALUE |
|---|---|
| 0 | 0 |
| 1 | 0 |
| 2 | 1 |
| 3 | 1 |
| 4 | 2 |
| 5 | 3 |
| 6 | 4 |
| 7 | 4 |
| 8 | 5 |
| 9 | 6 |
| 10 | 7 |
| ... | ... |

FIG. 11B

| INPUT VALUE | OUTPUT VALUE |
|---|---|
| 0 | 0 |
| 1 | 2 |
| 2 | 3 |
| 3 | 4 |
| 4 | 5 |
| 5 | 7 |
| 6 | 9 |
| 7 | 10 |
| 8 | 12 |
| 9 | 13 |
| 10 | 14 |
| ... | ... |

FIG. 11C

| INPUT VALUE | OUTPUT VALUE |
|---|---|
| 0 | 0 |
| 1 | 0 |
| 2 | 2 |
| 3 | 2 |
| 4 | 3 |
| 5 | 4 |
| 6 | 5 |
| 7 | 5 |
| 8 | 7 |
| 9 | 9 |
| 10 | 10 |
| ... | ... |

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

In image production, for example, a desired image is generated by performing a color adjustment process, referred to as color grading, on a photographed image. Generally, color grading is performed in an editing room which differs from a photography location. However, even at a photography location, simplified color grading may be performed in order to see how a photograph turned out. Hereinafter, color grading in an editing room will be described as "main color grading" and simplified color grading at a photography location will be described as "tentative color grading".

Let us now consider a case where both tentative color grading and main color grading are performed. In the editing room, for the purpose of reducing work load, an operation may be performed in which, after a state of an image is matched with a state after tentative color grading, the image after main color grading is finished.

At the photography location, for the purpose of reducing hassle and delay, tentative color grading may be performed using an image processing function of a display apparatus, and an image after tentative color grading may be displayed on the display apparatus. Specifically, color grading editing software installed on a personal computer (PC) transmits image processing information from the PC to a display apparatus. Subsequently, the display apparatus performs image processing on input image data (data of an image photographed by an imaging apparatus (camera): original image data), based on the image processing information from the PC, and displays an image based on image data after the image processing. At this point, using the color grading editing software, the PC records the image processing information in a storage apparatus. In addition, the imaging apparatus records the original image data in the storage apparatus. In the editing room, an image state (a state of an image) after tentative color grading can be reproduced by reading, from the storage apparatus, and using both the original image data and the image processing information. Specifically, by performing image processing on the original image data, based on the image processing information, image data after the tentative color grading can be obtained.

As a function of a display apparatus, a function for outputting image data after image processing performed by the display apparatus to a subsequent-stage display apparatus is proposed. Hereinafter, this function will be described as a "processed image output function".

When a processed image output function is available, at the photography location, a system in which an imaging apparatus, a first display apparatus, and a second display apparatus are daisy-chain connected can be realized. In this system, a first operator performs editing work for first tentative color grading while viewing the first display apparatus. The first display apparatus performs the first tentative color grading on the original image data in accordance with the editing work by the first operator to generate first processed image data that is image data after the first tentative color grading. In addition, the first display apparatus outputs the first processed image data to the second display apparatus. Subsequently, a second operator performs editing work for second tentative color grading while viewing the second display apparatus. The second display apparatus performs the second tentative color grading on the first processed image data in accordance with the editing work by the second operator to generate second processed image data that is image data after the first and second tentative color grading.

Generally, a final processing result (a color of an image or the like) differs between a case where the second tentative color grading is performed after the first tentative color grading and a case where the first tentative color grading is performed after the second tentative color grading. Therefore, in order to reproduce the second processed image data in the editing room, an order of execution of the first tentative color grading and the second tentative color grading at the photography location is important.

Examples of techniques for associating image processing information for color grading with image data are disclosed in Japanese Patent Application Laid-open No. 2014-107837 and Japanese Patent Application Laid-open No. 2014-131189. With the technique disclosed in Japanese Patent Application Laid-open No. 2014-107837, information on image processing performed by an imaging apparatus is recorded in association with original image data. With the technique disclosed in Japanese Patent Application Laid-open No. 2014-131189, information on image processing to be performed by a display apparatus is acquired and the acquired information is recorded in association with original image data.

SUMMARY OF THE INVENTION

However, conventional techniques do not take into consideration the execution of a plurality of tentative color grading processes (a plurality of image processing). Therefore, image data ultimately obtained at a photography location or, in other words, previous image data, on which a plurality of tentative color grading processes were performed, cannot be readily reproduced with high accuracy in an editing room. For example, in the editing room, mistaking an order of execution of a plurality of image processing may prevent the previous image data from being accurately reproduced.

The present invention in its first aspect provides an image processing apparatus, comprising:
an acquiring unit configured to acquire information on first image processing performed on input image data;
a processing unit configured to generate processed image data by performing second image processing on the input image data; and
an outputting unit configured to output the information on the first image processing acquired by the acquiring unit, information on the second image processing performed by the processing unit, and information regarding an order of execution of the first image processing and the second image processing either as a single piece of information or individual pieces of information, wherein the information on the first image processing and the information on the second image processing respectively include a parameter of a type defined in the ASC CDL.

The present invention in its second aspect provides an image processing apparatus, comprising:
an acquiring unit configured to acquire, from an external image processing apparatus having generated input image data by performing first image processing on original image data, the input image data and information on the first image processing;

a processing unit configured to generate processed image data by performing second image processing on the input image data; and an outputting unit configured to output the information on the first image processing acquired by the acquiring unit, information on the second image processing performed by the processing unit, and information regarding an order of execution of the first image processing and the second image processing either as a single piece of information or individual pieces of information.

The present invention in its third aspect provides an image processing method, comprising:

an acquiring step of acquiring information on first image processing performed on input image data;

a processing step of generating processed image data by performing second image processing on the input image data; and an outputting step of outputting the information on the first image processing acquired in the acquiring step, information on the second image processing performed in the processing step, and information regarding an order of execution of the first image processing and the second image processing either as a single piece of information or individual pieces of information, wherein the information on the first image processing and the information on the second image processing respectively include a parameter of a type defined in the ASC CDL.

The present invention in its fourth aspect provides an image processing method, comprising:

an acquiring step of acquiring, from an external image processing apparatus having generated input image data by performing first image processing on original image data, the input image data and information on the first image processing;

a processing step of generating processed image data by performing second image processing on the input image data; and an outputting step of outputting the information on the first image processing acquired in the acquiring step, information on the second image processing performed in the processing step, and information regarding an order of execution of the first image processing and the second image processing either as a single piece of information or individual pieces of information.

The present invention in its fifth aspect provides a non-transitory computer readable medium that stores a program, wherein the program causes a computer to execute the above mentioned image processing method.

Further features of the present invention will become apparent from the following description of exemplary embodiments with reference to the attached drawings.

BRIEF DESCRIPTION OF THE DRAWINGS

FIGS. 3A and 3B are diagrams showing image processing information according to first and second embodiments;

FIGS. 5A to 5C are diagrams showing recording history information according to the first embodiment;

FIG. 6A is a diagram showing output history information (input history information) according to the first embodiment, and FIG. 6B is a diagram showing output history information according to the first embodiment;

FIG. 10 is a diagram showing combined information according to the second embodiment; and FIGS. 11A to 11C are diagrams showing one-dimensional LUTs according to a modification.

DESCRIPTION OF THE EMBODIMENTS

First Embodiment

A first embodiment of the present invention will be described below. Hereinafter, an example of a display apparatus having an image processing apparatus according to the present embodiment will be described.

For example, the display apparatus is a transmissive display apparatus such as a liquid crystal display apparatus and a micro-electro-mechanical system (MEMS) shutter system display apparatus. The display apparatus may be a self-luminous display apparatus such as an organic electro-luminescence (EL) display apparatus and a plasma display apparatus.

The image processing apparatus may be a separate apparatus from the display apparatus. The image processing apparatus and the display apparatus may also be a projection apparatus (a projector), a personal computer (a PC), a PDA, a tablet terminal, a mobile phone terminal (including a smartphone), a television apparatus, an imaging apparatus (a digital camera), a digital photo frame, a game device, an electric home appliance, a car-mounted apparatus, and the like.

Configuration of Image Processing System

Figure 1:
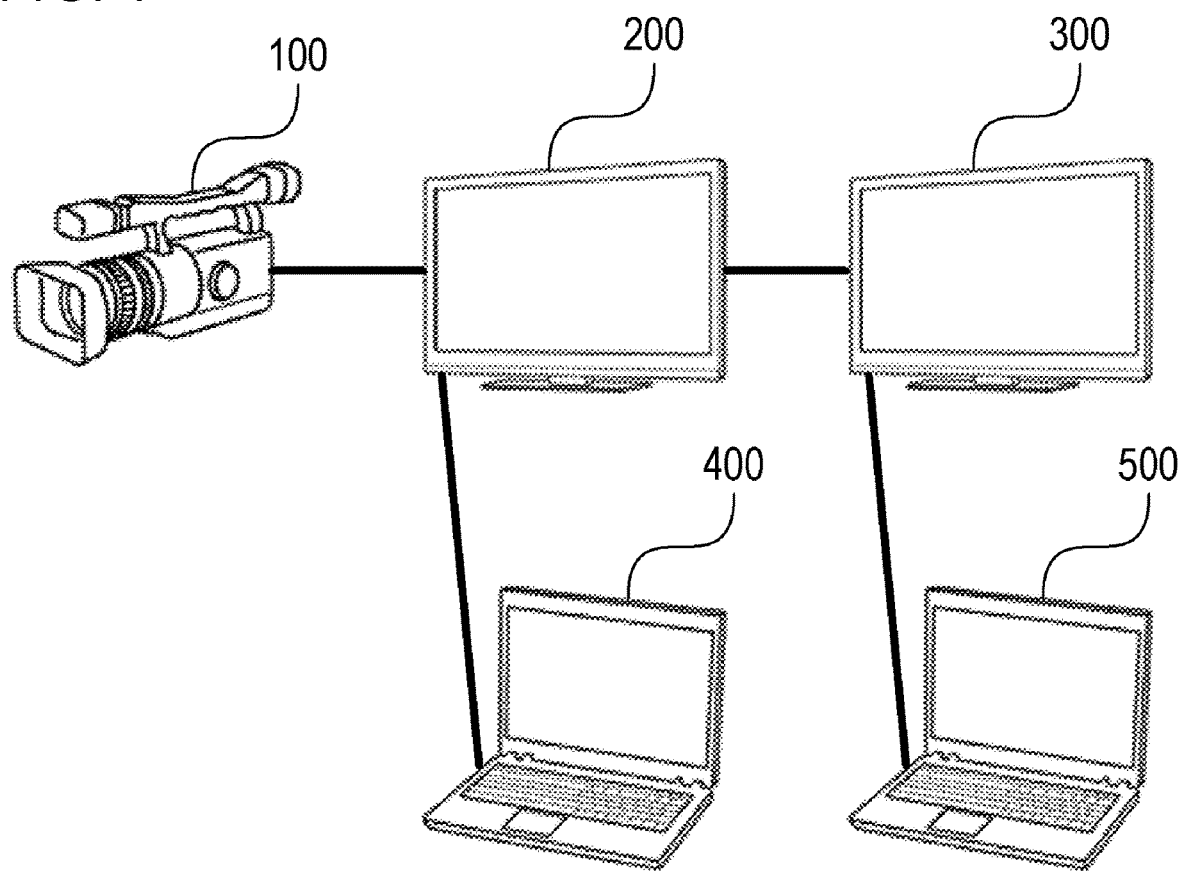
FIG. 1 is a diagram showing a schematic configuration of an image processing system according to a first embodiment.

FIG. 1 shows a schematic configuration of an image processing system according to the present embodiment. The image processing system according to the present embodiment includes a camera 100, a display apparatus 200, a display apparatus 300, a PC 400, and a PC 500.

The camera 100 outputs photographed image data (original image data) to the display apparatus 200. For example, the camera 100 and the display apparatus 200 are connected to each other using a serial digital interface (SDI) cable, and the camera 100 outputs the original image data to the display apparatus 200 via the SDI cable.

Color grading editing software is installed on the PC 400, and an application screen of the color grading editing software installed on the PC 400 is displayed on a display screen of the PC 400. The PC 400 generates first image processing information using the color grading editing software of the PC 400, and outputs the first image processing information to the display apparatus 200. For example, the display apparatus 200 and the PC 400 are connected to each other using a Universal Serial Bus (USB) cable, and the PC 400 outputs the first image processing information to the display apparatus 200 via the USB cable. The first image processing information is information on color grading (first color grading: a color adjustment process) based on the color grading editing software of the PC 400.

The display apparatus 200 generates first processed image data by performing the first color grading on the original image data acquired from the camera 100, and displays an image based on the first processed image data on its own display screen. In addition, the display apparatus 200 outputs the first processed image data to the display apparatus 300. For example, the display apparatus 200 and the display apparatus 300 are connected to each other using an SDI cable, and the display apparatus 200 outputs the first processed image data to the display apparatus 300 via the SDI cable.

A first operator uses the color grading editing software of the PC 400 to perform first editing work for first color grading while checking an image displayed by the display apparatus 200. Using the color grading editing software of the PC 400, the PC 400 generates (updates) first image processing information in accordance with the first editing work and outputs the generated first image processing information to the display apparatus 200. The display apparatus 200 continuously performs the same first color grading until new first image processing information is input, and updates the first color grading once the new first image processing information is input.

Color grading editing software is also installed on the PC 500, and an application screen of the color grading editing software installed on the PC 500 is displayed on a display screen of the PC 500. The PC 500 generates second image processing information using the color grading editing software of the PC 500, and outputs the second image processing information to the display apparatus 300. For example, the display apparatus 300 and the PC 500 are connected to each other using a USB cable, and the PC 500 outputs the second image processing information to the display apparatus 300 via the USB cable. The second image processing information is information on color grading (second color grading: a color adjustment process) based on the color grading editing software of the PC 500.

The display apparatus 300 generates second processed image data by performing the second color grading on the first processed image data acquired from the display apparatus 200, and displays an image based on the second processed image data on its own display screen. In addition, the display apparatus 300 outputs the second processed image data to the outside.

A second operator uses the color grading editing software of the PC 500 to perform second editing work for second color grading while checking an image displayed by the display apparatus 300. Using the color grading editing software of the PC 500, the PC 500 generates (updates) second image processing information in accordance with the second editing work and outputs the generated second image processing information to the display apparatus 300. The display apparatus 300 continuously performs the same second color grading until new second image processing information is input, and updates the second color grading once the new second image processing information is input.

Configuration of Camera 100

Figure 2A:
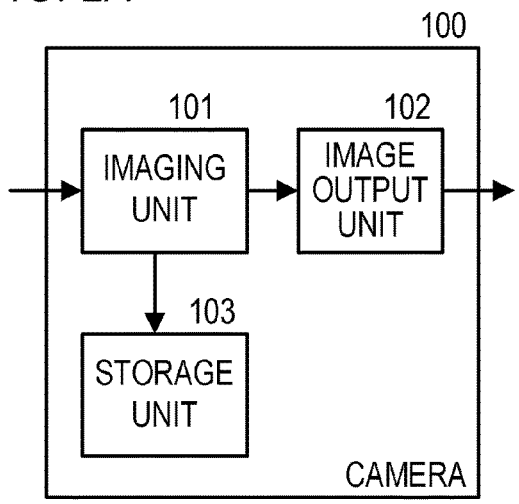
FIG. 2A is a functional block diagram of a camera according to the first embodiment.

FIG. 2A is a functional block diagram of the camera 100. The camera 100 includes an imaging unit 101, an image output unit 102, and a storage unit 103. The imaging unit 101 generates original image data by imaging and outputs the original image data to the image output unit 102. In addition, the imaging unit 101 records the original image data in the storage unit 103. The image output unit 102 outputs the original image data acquired from the imaging unit 101 to the display apparatus 200.

Configuration of Display Apparatuses 200 and 300

Figure 2B:
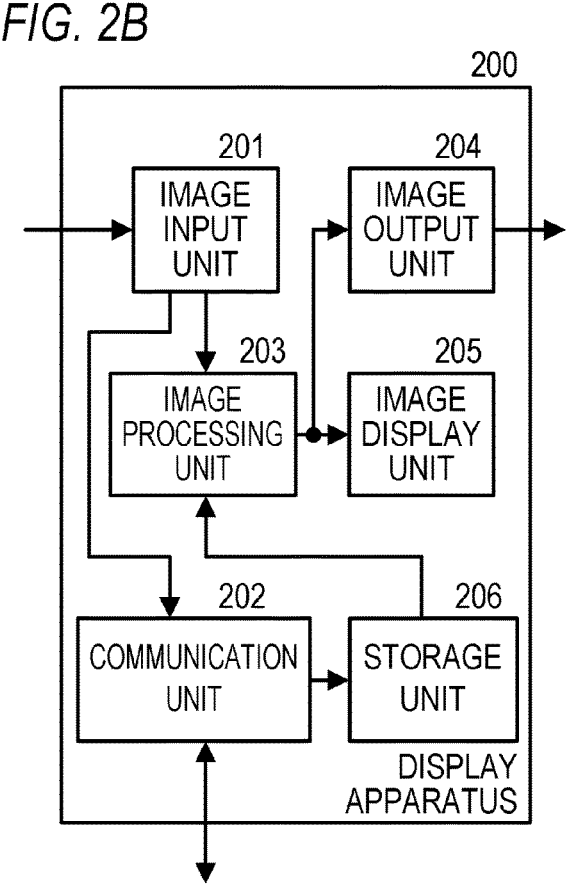
FIGS. 2B and 2C are functional block diagrams of display apparatuses according to the first embodiment.

FIG. 2B is a functional block diagram of the display apparatus 200. The display apparatus 200 includes an image input unit 201, a communication unit 202, an image processing unit 203, an image output unit 204, an image display unit 205, and a storage unit 206.

The image input unit 201 acquires input image data from an external apparatus and outputs the input image data to the image processing unit 203. In addition, the image input unit 201 analyzes metadata added to the input image data. As a result, when the input image data is being subjected to first image processing, the image input unit 201 acquires input history information related to the first image processing from the input image data and outputs the input history information to the communication unit 202. When the input image data is acquired in an SDI data format, for example, the metadata of the input image data is added to an ancillary area of SDI data. Details of input history information will be provided later. Alternatively, the input image data and the input history information may be individually acquired from the outside.

The communication unit 202 acquires image processing information from an external PC and records the image processing information in the storage unit 206. The image processing information is information on second image processing performed by the image processing unit 203. For example, the image processing information includes at least one of an identifier of the second image processing and a parameter used in the second image processing.

Let us now consider a case where the input image data is RGB image data and a parameter of a type defined in the American Society of Cinematographers Color Decision List (ASC CDL) is used in the second image processing. In the ASC CDL, slope, offset, and power are defined as parameter types. In this case, as the image processing information, for example, information shown in FIGS. 3A and 3B is acquired. With the information shown in FIGS. 3A and 3B, a value of slope, a value of offset, and a value of power are described for each of an R value, a G value, and a B value. An identifier of the second image processing (a value of an image processing ID) is also described.

In addition, the communication unit 202 outputs the input history information acquired from the image input unit 201 to an external PC. The communication unit 202 records mode switching information acquired from the PC 400 in the storage unit 206.

The image processing unit 203 generates processed image data by performing the second image processing on input image data acquired from the image input unit 201, based on the image processing information recorded in the storage unit 206. Let us now consider a case where the input image data is RGB image data and the image processing information is the information shown in FIGS. 3A and 3B. In this case, by normalizing (compressing) a gradation value (an R value, a G value, and a B value) of the input image data, the image processing unit 203 obtains an input value IN of at least 0 and not more than 1. Using Expression 1 below, the image processing unit 203 calculates an output value OUT based on the input value IN, a slope value slope, an offset value offset, and a power value power. In addition, by expanding the output value OUT, the image processing unit 203 obtains a gradation value having the same number of bits as the number of bits of the gradation value of the input image data as a gradation value of the processed image data. The image processing unit 203 performs these processes on each gradation value of the input image data. As a result, processed image data is generated. Alternatively, the number of bits of a gradation value of the processed image data may differ from the number of bits of a gradation value of the input image data.

$$OUT = (slope \times IN + offset)^{power} \quad \text{(Expression 1)}$$

In addition, the image processing unit 203 outputs the processed image data to the image display unit 205. Furthermore, the image processing unit 203 generates output image data by adding output history information related to at least the second image processing to the processed image data as metadata. When the input image data has not been subjected to image processing, the image processing unit 203 adds output history information related to the second image processing to the processed image data. When the input image data has been subjected to image processing, the image processing unit 203 adds, to the processed image data, output history information related to the second image processing and to the image processing performed on the input image data. In addition, the image processing unit 203 outputs the output image data to the image output unit 204. When the output image data is output to the outside in an SDI data format, for example, the output history information is added to an ancillary area of SDI data. Details of output history information will be provided later.

The image output unit 204 outputs the output image data (processed image data to which output history information has been added) acquired from the image processing unit 203 to the outside. Alternatively, the processed image data and the output history information may be individually output to the outside without generating output image data. Output of processed image data to the outside may be omitted.

The image display unit 205 displays an image based on the processed image data acquired from the image processing unit 203.

The storage unit 206 stores information (image processing information and mode switching information) and the like acquired from an external PC.

Figure 2C:
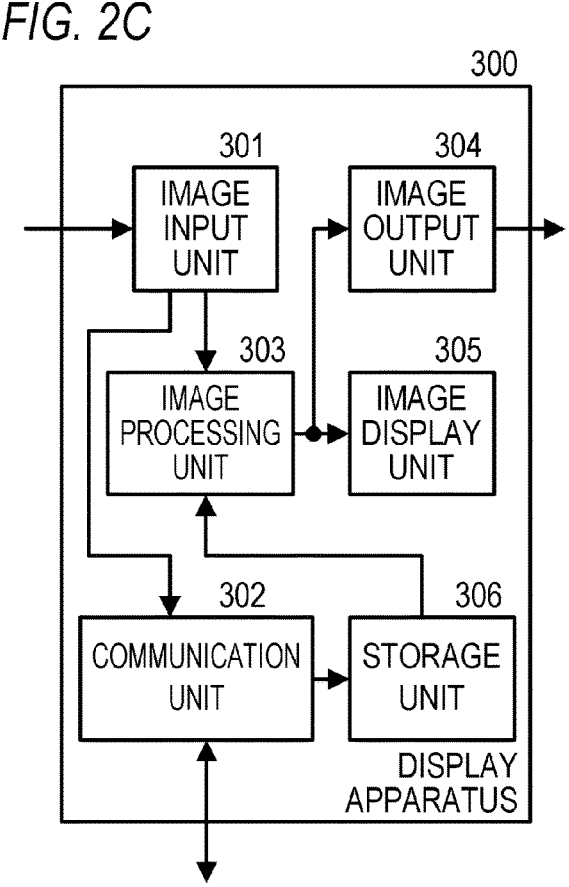

FIG. 2C is a functional block diagram of the display apparatus 300. The display apparatus 300 includes an image input unit 301, a communication unit 302, an image processing unit 303, an image output unit 304, an image display unit 305, and a storage unit 306. The image input unit 301 has a similar function to the image input unit 201, the communication unit 302 has a similar function to the communication unit 202, and the image processing unit 303 has a similar function to the image processing unit 203. In addition, the image output unit 304 has a similar function to the image output unit 204, the image display unit 305 has a similar function to the image display unit 205, and the storage unit 306 has a similar function to the storage unit 206.

With respect to the display apparatus 200, the external apparatus is the camera 100, the input image data is original image data, the first image processing does not exist, and the external PC is the PC 400. In addition, with respect to the display apparatus 200, the image processing information is the first image processing information, the second image processing is the first color grading, and the processed image data and the output image data are the first processed image data. On the other hand, with respect to the display apparatus 300, the external apparatus is the display apparatus 200, the input image data is the first processed image data, the first image processing is the first color grading, and the external PC is the PC 500. In addition, with respect to the display apparatus 300, the image processing information is the second image processing information, the second image processing is the second color grading, and the processed image data and the output image data are the second processed image data.

Process Flow of Display Apparatus 200

Figure 4:
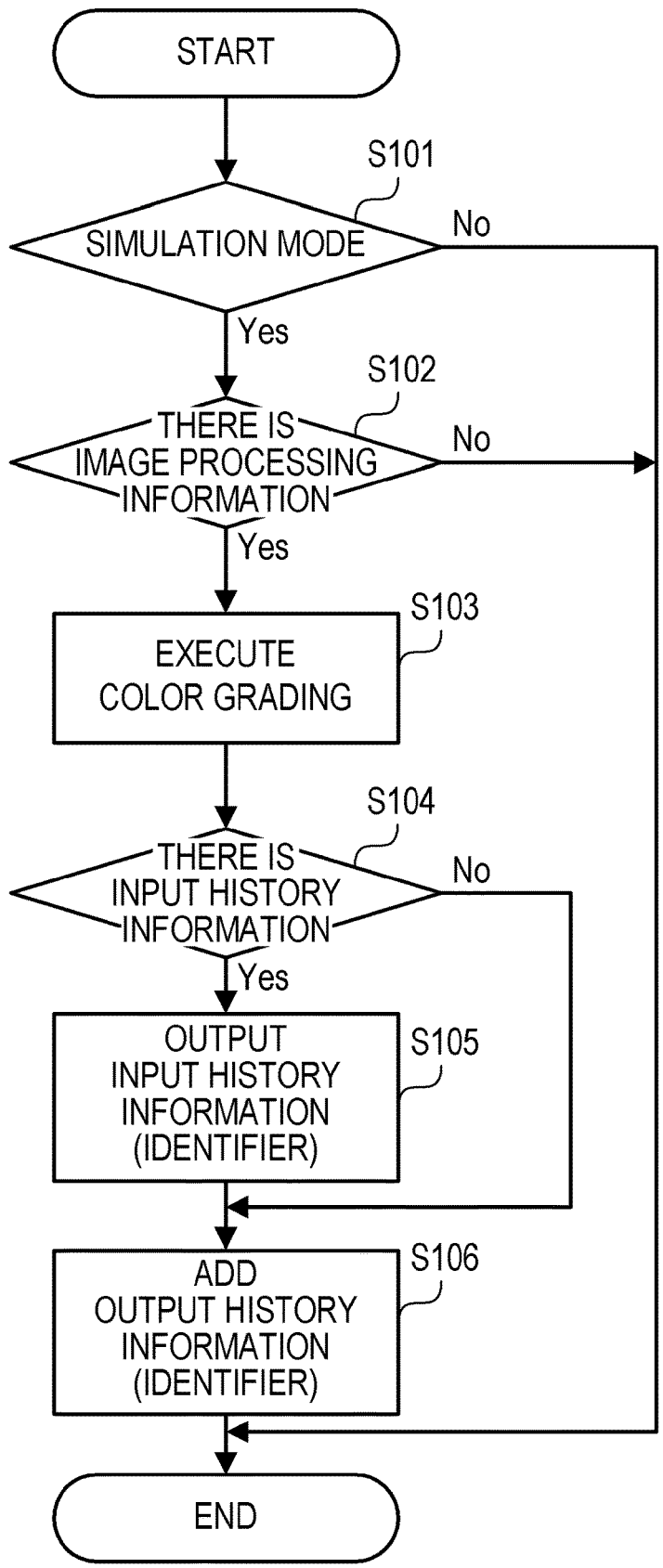
FIG. 4 is a flow chart showing a process flow according to the first embodiment.

An example of a process flow of the display apparatus 200 will be described with reference to FIG. 4. FIG. 4 is a flow chart showing a process flow of the display apparatus 200 and the display apparatus 300. The process flow shown in FIG. 4 is performed with respect to each frame of input image data.

First, in S101, the image processing unit 203 refers to mode switching information recorded in the storage unit 206 and determines whether or not a simulation mode of the display apparatus 200 is enabled. The simulation mode is an operating mode in which image processing based on image processing information from an external PC is executed. The first operator can designate a state (enabled or disabled) of the simulation mode of the display apparatus 200 using the color grading editing software of the PC 400. Once the state of the simulation mode of the display apparatus 200 is designated, using the color grading editing software of the PC 400, the PC 400 outputs mode switching information in accordance with the designated state to the communication unit 202. The communication unit 202 records the mode switching information from the PC 400 in the storage unit 206. When the state of the simulation mode of the display apparatus 200 is switched from enabled to disabled, first image processing information recorded in the storage unit 206 is deleted. The first image processing information is generated during a period in which the simulation mode of the display apparatus 200 is enabled.

When the simulation mode of the display apparatus 200 is disabled, the present process flow is terminated without performing the first color grading of the image processing unit 203. As a result, the image processing unit 203 outputs the original image data without modification to the image output unit 204 and the image display unit 205. When the simulation mode of the display apparatus 200 is enabled, the process is advanced to S102. In the present embodiment, it is assumed that the simulation mode is enabled. Therefore, the process is advanced to S102.

In S102, the image processing unit 203 determines whether or not the first image processing information is recorded in the storage unit 206. When the first image processing information is output from the PC 400 to the communication unit 202 after the state of the simulation mode of the display apparatus 200 is switched from disabled to enabled, the communication unit 202 records the first image processing information in the storage unit 206. Therefore, the determination of S102 may be restated as "a determination of whether or not the first image processing information is output from the PC 400 after the state of the simulation mode of the display apparatus 200 is switched from disabled to enabled".

When the first image processing information is not recorded in the storage unit 206, the present process flow is terminated without performing the first color grading of the image processing unit 203. As a result, the image processing unit 203 outputs the original image data without modification to the image output unit 204 and the image display unit 205. When the first image processing information is recorded in the storage unit 206, the process is advanced to S103. In the present embodiment, it is assumed that the information shown in FIG. 3A is recorded in the storage unit 206 as the first image processing information. Therefore, the process is advanced to S103.

In S103, the image processing unit 203 generates first processed image data by performing first color grading on the original image data, based on the first image processing information recorded in the storage unit 206. In addition, the image processing unit 203 outputs the first processed image data to the image display unit 205.

Let us now consider a case where a gradation value of the original image data and a gradation value of the first processed image data are 10-bit values (values of at least 0 and not more than 1023) and a pixel value (an RGB value) of the original image data is expressed as (R value, G value, B value)=(0, 511, 1023).

First, the image processing unit 203 divides each of the R value=0, the G value=511, and the B value=1023 of the original image data by 1023 (normalization). As a result, an input value IN_R=0/1023=0 corresponding to the R value, an input value IN_G=511/1023=0.5 corresponding to the G value, and an input value IN_B=1023/1023=1 corresponding to the B value are obtained.

Next, using Expression 1, the image processing unit 203 calculates an output value OUT_R corresponding to the R value, an output value OUT_G corresponding to the G value, and an output value OUT_B corresponding to the B value from the input values IN_R, IN_G, and IN_B and the first image processing information (the information shown in FIG. 3A). In this case, the output value OUT_R=(0.8×0+0.05)$^{0.9}$=0.067, the output value OUT_G=(0.8×0.5+0.05)$^{0.9}$=0.487, and the output value OUT_B=(0.8×1+0.05)$^{0.9}$=0.864 are obtained.

In addition, the image processing unit 203 multiplies each of the output value OUT_R, the output value OUT_G, and the output value OUT_B by 1023 (expansion). As a result, (R value, G value, B value)=(69 (=0.067×1023), 498 (=0.487×1023), 884 (=0.864×1023)) is obtained as the pixel value (RGB value) of the first processed image data.

Following S103, in S104, the image input unit 201 analyzes metadata of the original image data and determines whether or not input history information is present. The process is advanced to S105 when the input history information is present but the process is advanced to S106 when the input history information is absent. In the present embodiment, the original image data has not been subjected to image processing and input history information has not been added to the original image data. Therefore, the process is advanced to S106.

In S105, the communication unit 202 outputs the input history information added to the original image data to the PC 400. In the present embodiment, since input history information is not added to the original image data, the process of S105 is not performed. In this case, the PC 400 generates and stores recording history information related to the first color grading performed in S102. For example, the PC 400 stores information shown in FIG. 5A as the recording history information. The information shown in FIG. 5A indicates that there is no image processing to be executed in advance. Specifically, "none" is described in a field labeled "first". In addition, the information shown in FIG. 5A includes information on the first color grading. Specifically, the information shown in FIG. 5A includes an identifier of the first color grading and a parameter of the first color grading.

Moreover, the recording history information that is recorded in the PC 400 is not limited to the information shown in FIG. 5A. For example, the fact that there is no image processing to be executed in advance need not be indicated. One of the identifier of the first color grading and a parameter of the first color grading need not be included. Information indicating that there is no image processing to be executed in advance and information on the first color grading may be recorded individually. The recording history information may or may not be recorded with respect to each frame of the first processed image data. The recording history information may be recorded only at a timing where the recording history information is initially generated and a timing where the recording history information is updated (changed). The recording history information may be generated by the display apparatus 200.

In S106, the image processing unit 203 adds information related to the first color grading performed in S102 to the first processed image data as output history information. For example, the image processing unit 203 adds the identifier "1" of the first color grading to the first processed image data as output history information. In addition, the image processing unit 203 outputs the first processed image data to which the output history information has been added to the image output unit 204.

Moreover, the output history information added to the first processed image data may or may not be the same as the recording history information that is recorded in the PC 400. Information indicating that there is no image processing to be executed in advance and information on the first color grading may be added to the first processed image data as individual pieces of information. Information indicating that there is no image processing to be executed in advance and information on the first color grading may be output to the outside as individual pieces of information without being added to the first processed image data. The output history information may or may not be output to the outside with respect to each frame of the first processed image data. The output history information may be output to the outside only at a timing where the output history information is initially generated and a timing where the output history information is updated (changed).

Process Flow of Display Apparatus 300

An example of a process flow of the display apparatus 300 will be described with reference to FIG. 4.

First, in S101, the image processing unit 303 refers to mode switching information recorded in the storage unit 206 and determines whether or not a simulation mode of the display apparatus 300 is enabled. The second operator can designate a state of the simulation mode of the display apparatus 300 using the color grading editing software of the PC 500. Once the state of the simulation mode of the display apparatus 300 is designated, using the color grading editing software of the PC 500, the PC 500 outputs mode switching information in accordance with the designated state to the communication unit 302. The communication unit 302 records the mode switching information from the PC 500 in the storage unit 306. When the state of the simulation mode of the display apparatus 300 is switched from enabled to disabled, second image processing information recorded in the storage unit 306 is deleted. The second image processing information is generated during a period in which the simulation mode of the display apparatus 300 is enabled.

When the simulation mode of the display apparatus 300 is disabled, the present process flow is terminated without performing the second color grading of the image processing unit 303. As a result, the image processing unit 303 outputs the first processed image data without modification to the image output unit 304 and the image display unit 305. When the simulation mode of the display apparatus 300 is enabled, the process is advanced to S102. In the present embodiment, it is assumed that the simulation mode is enabled. Therefore, the process is advanced to S102.

In S102, the image processing unit 303 determines whether or not the second image processing information is recorded in the storage unit 306. When the second image processing information is output from the PC 500 to the communication unit 302 after the state of the simulation mode of the display apparatus 300 is switched from disabled to enabled, the communication unit 302 records the second image processing information in the storage unit 306. Therefore, the determination of S102 may be restated as "a determination of whether or not the second image processing information is output from the PC 500 after the state of the simulation mode of the display apparatus 300 is switched from disabled to enabled".

When the second image processing information is not recorded in the storage unit 306, the present process flow is terminated without performing the second color grading of the image processing unit 303. As a result, the image processing unit 303 outputs the first processed image data without modification to the image output unit 304 and the image display unit 305. When the second image processing information is recorded in the storage unit 306, the process is advanced to S103. In the present embodiment, it is assumed that the information shown in FIG. 3B is recorded in the storage unit 306 as the second image processing information. Therefore, the process is advanced to S103.

In S103, the image processing unit 303 generates second processed image data by performing second color grading on the first processed image data, based on the second image processing information recorded in the storage unit 306. In addition, the image processing unit 303 outputs the second processed image data to the image display unit 205.

Let us now consider a case where a gradation value of the first processed image data and a gradation value of the second processed image data are 10-bit values (values of at least 0 and not more than 1023) and a pixel value (an RGB value) of the first processed image data is expressed as (R value, G value, B value)=(69, 498, 884). In this case, by a calculation similar to that performed in the first color grading, (R value, G value, B value)=(20, 322, 719) is obtained as the pixel value of the second processed image data from the pixel value of the first processed image data and the second image processing information (the information shown in FIG. 3B).

Following S103, in S104, the image input unit 301 analyzes metadata of the first processed image data and determines whether or not input history information is present. The process is advanced to S105 when the input history information is present but the process is advanced to S106 when the input history information is absent. In the present embodiment, the first processed image data is subjected to first color grading, and the identifier "1" of the first color grading is added as input history information to the first image data. Therefore, the process is advanced to S105.

In S105, the communication unit 302 outputs the input history information (the identifier "1") added to the first processed image data to the PC 500. In addition, based on the input history information, the PC 500 generates and stores recording history information related to the first color grading performed on the first processed image data and the second color grading performed in S102. Specifically, the PC 500 stores recording history information which includes information on the first color grading and the second color grading and information regarding an order of execution of these image processing. In the present embodiment, the PC 500 stores information shown in FIG. 5B as the recording history information. In the information shown in FIG. 5B, the identifier "1" of the first color grading is described in the "first" field, and "second" and subsequent fields are left blank. In addition, the information shown in FIG. 5B includes information on the second color grading. Specifically, the information shown in FIG. 5B includes an identifier of the second color grading and a parameter of the second color grading.

Moreover, the recording history information that is recorded in the PC 500 is not limited to the information shown in FIG. 5B. For example, the information may not include the identifier of the first color grading but may include a parameter of the first color grading. The information may include both the identifier of the first color grading and a parameter of the first color grading. One of the identifier of the second color grading and a parameter of the second color grading may not be included. Information on the first color grading and the second color grading and information regarding an order of execution of these image processing may be recorded individually. The recording history information may or may not be recorded with respect to each frame of the second processed image data. The recording history information may be recorded only at a timing where the recording history information is initially generated and a timing where the recording history information is updated (changed). The recording history information may be generated by the display apparatus 300.

In S106, the image processing unit 303 adds information related to the first color grading performed on the first processed image data and the second color grading performed in S102 on the second processed image data as output history information. Specifically, the image processing unit 303 adds information shown in FIG. 6A to the second processed image data as output history information. In the information shown in FIG. 6A, the identifier "1" of the first color grading and an identifier "2" of the second color grading are described in an order of execution of these image processing. In addition, the image processing unit 303 outputs the second processed image data to which the output history information (the identifiers) has been added to the image output unit 304.

Moreover, the output history information added to the second processed image data may or may not be the same as the recording history information that is recorded in the PC 500. Information on the first color grading and the second color grading and information regarding an order of execution of these image processing may be added to the second processed image data as individual pieces of information. Information on the first color grading and the second color grading and information regarding an order of execution of these image processing may be output to the outside as individual pieces of information without being added to the second processed image data. The output history information may or may not be output to the outside with respect to each frame of the second processed image data. The output history information may be output to the outside only at a timing where the output history information is initially generated and a timing where the output history information is updated (changed).

Effects

As described above, according to the present embodiment, information on the first color grading and the second color grading and information regarding an order of execution thereof are output from the display apparatus 300 either as a single piece of information or as individual pieces of information. In addition, the PC 500 stores such information. Therefore, by checking at least one of output information of the display apparatus 300 and recorded information of the PC 500, a user can readily and accurately comprehend the plurality of image processing performed on the second processed image data and an order of these image processing. Specifically, the user can readily comprehend that the first color grading had been performed first and that the second color grading had been performed after the first color grading.

As a result, previous image data, on which a plurality of image processing were performed, can be readily reproduced with high accuracy. Specifically, the second processed image data can be readily reproduced with high accuracy from the original image data. Let us now consider a case where a pixel value (an RGB value) of the original image data is expressed as (R value, G value, B value)=(0, 511, 1023), the first image processing information is the information shown in FIG. 3A, and the second image processing information is the information shown in FIG. 3B. As described earlier, when the second color grading is performed after the first color grading, (R value, G value, B value)=(20, 322, 719) is obtained as a final pixel value. However, when the first color grading is performed after the second color grading, (R value, G value, B value)=(69, 357, 780) is obtained as a final pixel value, which means that the previous pixel value cannot be reproduced. As described earlier, according to the present embodiment, the user can readily comprehend that the first color grading had been performed first and that the second color grading had been performed after the first color grading. As a result, the user can readily issue an instruction to perform the second color grading after the first color grading. Accordingly, the previous pixel value (20, 322, 719) can be readily reproduced.

Moreover, the color grading editing software may perform various processes using at least one of the output information of the display apparatus 300 and the recorded information of the PC 500. For example, in accordance with a user operation designating the first image processing information and the second image processing information, the color grading editing software may automatically determine an order of execution of these image processing so that the second color grading is performed after the first color grading. The color grading editing software may automatically set the first image processing information and the second image processing information as initial values. The order of execution of the plurality of image processing may be designated by the user. When a user operation only designating the second image processing information, a user operation for executing the first color grading after the second color grading, or the like is performed, the color grading editing software may perform a process of issuing a prescribed notification to the user. The prescribed notification is, for example, a notification to the effect that the second processed image data is not reproduced.

Moreover, the display apparatus 200 may include the functions of the PC 400 and the display apparatus 300 may include the functions of the PC 500. In this case, the storage unit which stores the recording history information may be built into a display apparatus or may be configured to be attachable and detachable with respect to the display apparatus.

Moreover, three or more display apparatuses may be used. Let us now consider a case where a third display apparatus is connected to the second display apparatus 300. APC is also connected to the third display apparatus. The third display apparatus has similar functions to the display apparatus 300, and the PC connected to the third display apparatus has similar functions to the PC 500. A process performed by the third display apparatus will be described. The third display apparatus acquires second processed image data from the display apparatus 300 and performs third color grading on the second processed image data. The second processed image data has been sequentially subjected to a plurality of image processing (the first color grading and the second color grading). The third display apparatus acquires information on the first color grading and the second color grading and information regarding an order of execution of these image processing either as a single piece of information or as individual pieces of information. In addition, the third display apparatus outputs information on the first to third color grading and information regarding an order of execution of these image processing to the outside either as a single piece of information or as individual pieces of information. The PC connected to the third display apparatus stores the information on the first to third color grading and the information regarding an order of execution of these image processing either as a single piece of information or as individual pieces of information.

Specifically, the third display apparatus acquires the information shown in FIG. 6A as input history information. The third display apparatus outputs information shown in FIG. 6B as output history information. In the information shown in FIG. 6B, the identifier "1" of the first color grading, the identifier "2" of the second color grading, and an identifier "3" of the third color grading are described in an order of execution of these image processing. In addition, the PC connected to the third display apparatus stores information shown in FIG. 5C as the recording history information. In the information shown in FIG. 5C, the identifier "1" of the first color grading is described in the "first" field, the identifier "2" of the second color grading is described in the "second" field, and "third" and subsequent fields are left blank. In addition, the information shown in FIG. 5C includes information on the third color grading.

Figure 7:
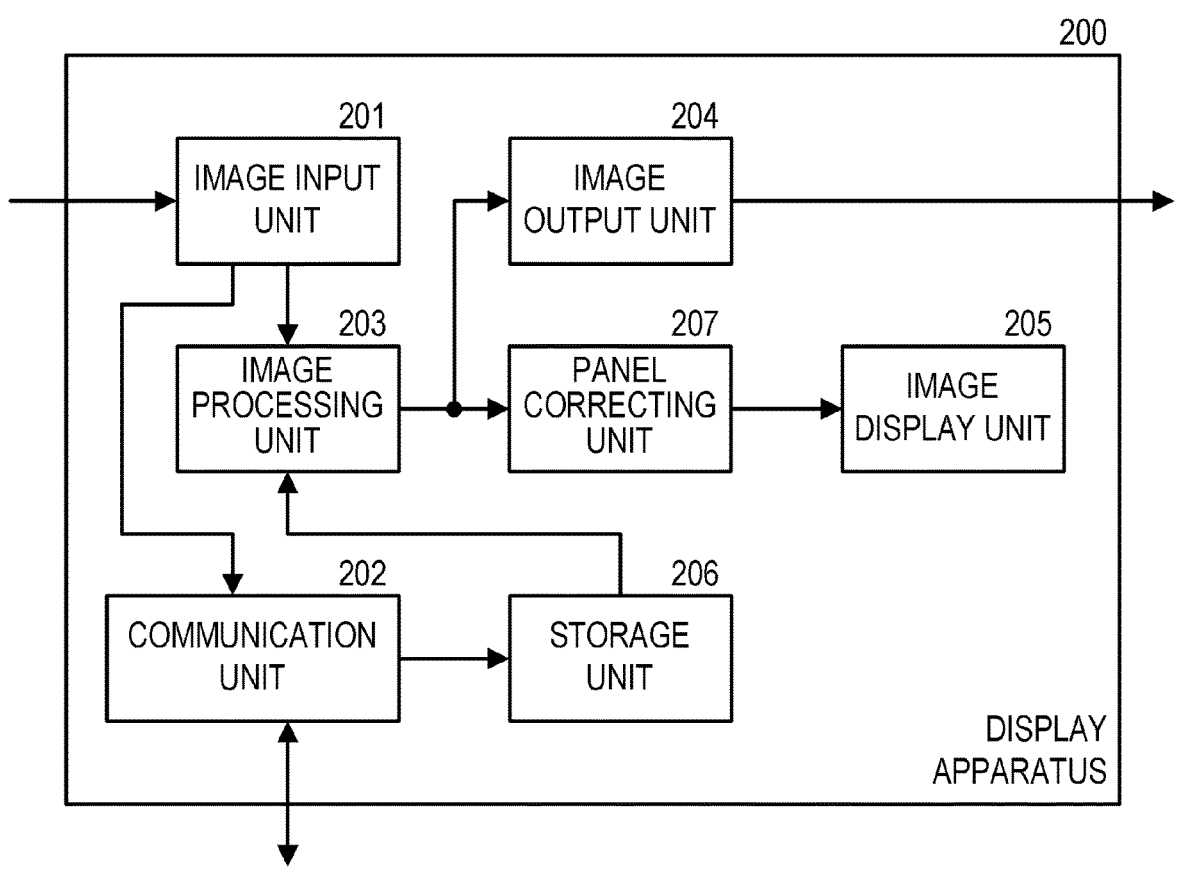
FIG. 7 is a functional block diagram showing a display apparatus according to the first embodiment.

Moreover, the configuration of the display apparatus 200 is not limited to the configuration shown in FIG. 2B. For example, the display apparatus 200 may be configured as shown in FIG. 7. The display apparatus 200 shown in FIG. 7 further includes a panel correcting unit 207. The panel correcting unit 207 performs a panel correction process on the first processed image data, which is image processing in accordance with characteristics (display characteristics) of the image display unit 205, and outputs the image data after the panel correction process to the image display unit 205. The panel correction process is, for example, a color space conversion process or a gamma conversion process. The first processed image data not subjected to the panel correction process is output to the outside of the display apparatus 200. Therefore, information on the panel correction process is not included in the output history information and the recording history information. A similar description applies to the configurations of other display apparatuses including the display apparatus 300.

Moreover, the image processing performed by each display apparatus need not be color grading. For example, a brightness adjustment process, a blurring process, an edge enhancement process, and the like may be performed as image processing. In addition, a parameter used in the image processing need not be a parameter of the types defined in the ASC CDL. For example, a lookup table (LUT) indicating a correspondence relationship between a gradation value prior to conversion and a gradation value after the conversion may be used. A one-dimensional LUT which individually converts an R value, a G value, and a B value may be used or a three-dimensional LUT which converts an RGB value may be used.

While the same color grading is continued until new image processing information is input and the color grading is updated once the new image processing information is input in the description given above, this configuration is not restrictive. For example, image processing information may be individually set with respect to each of a plurality of periods of image data (a moving image). Image processing information may be individually set with respect to each of a plurality of scenes of image data (a moving image). These settings can be realized by, for example, including information on a corresponding period or scene in image processing information that is transmitted from a PC to a display apparatus. In addition, in these cases, the input history information, the output history information, and the recording history information favorably include information on a corresponding period or scene.

Moreover, the original image data is not limited to captured (photographed) image data. For example, the original image data may be illustration image data, computer graphic (CG) image data, and the like.

Second Embodiment

A second embodiment of the present invention will be described below. Hereinafter, points (configurations, processes, and the like) that differ from those of the first embodiment will be described in detail and descriptions of points that are the same as those of the first embodiment will be omitted.

In the first embodiment, the input history information and the output history information are identifiers. In addition, in the recording history information, an identifier is described as information on image processing to be executed in advance. However, a parameter is necessary in order to perform image processing, and there is no guarantee that a parameter can be readily comprehended from an identifier. In consideration thereof, in the present embodiment, information including a parameter of each image processing is adopted as input history information and output history information. In addition, in the recording history information, information including a parameter is described as information on image processing to be executed in advance.

Configuration of Display Apparatus

Figure 8A:
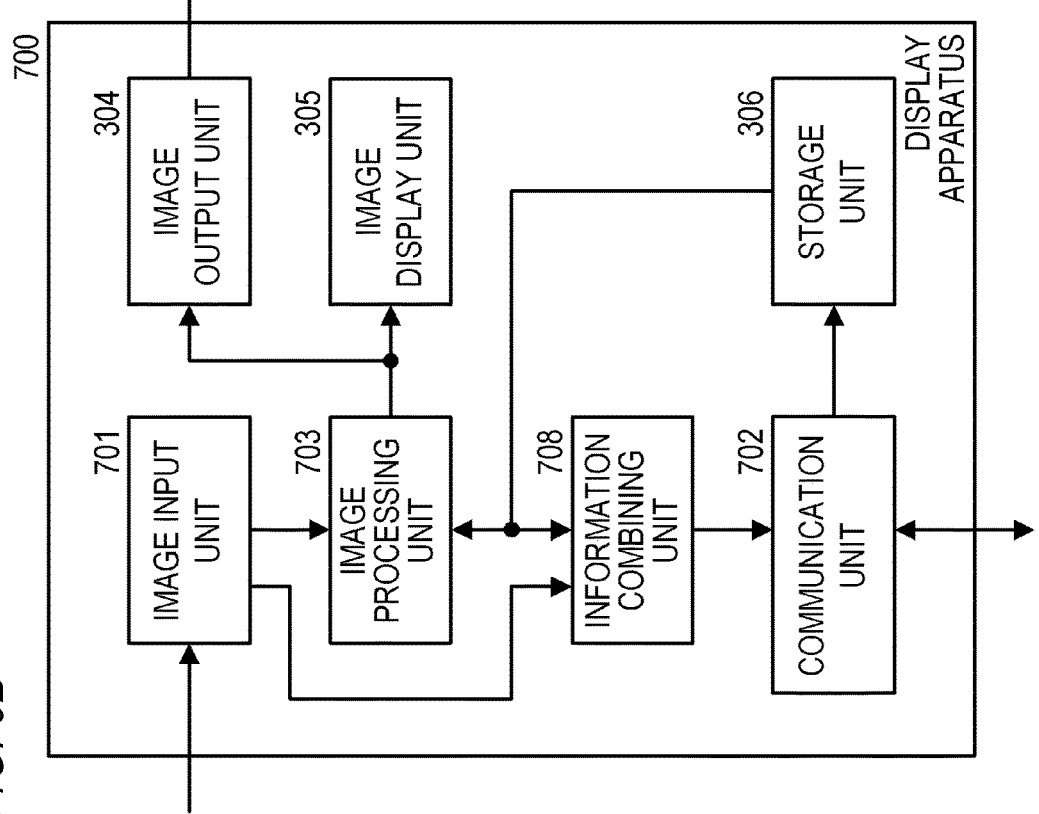
FIGS. 8A and 8B are functional block diagrams of display apparatuses according to the second embodiment.
Figure 8B:
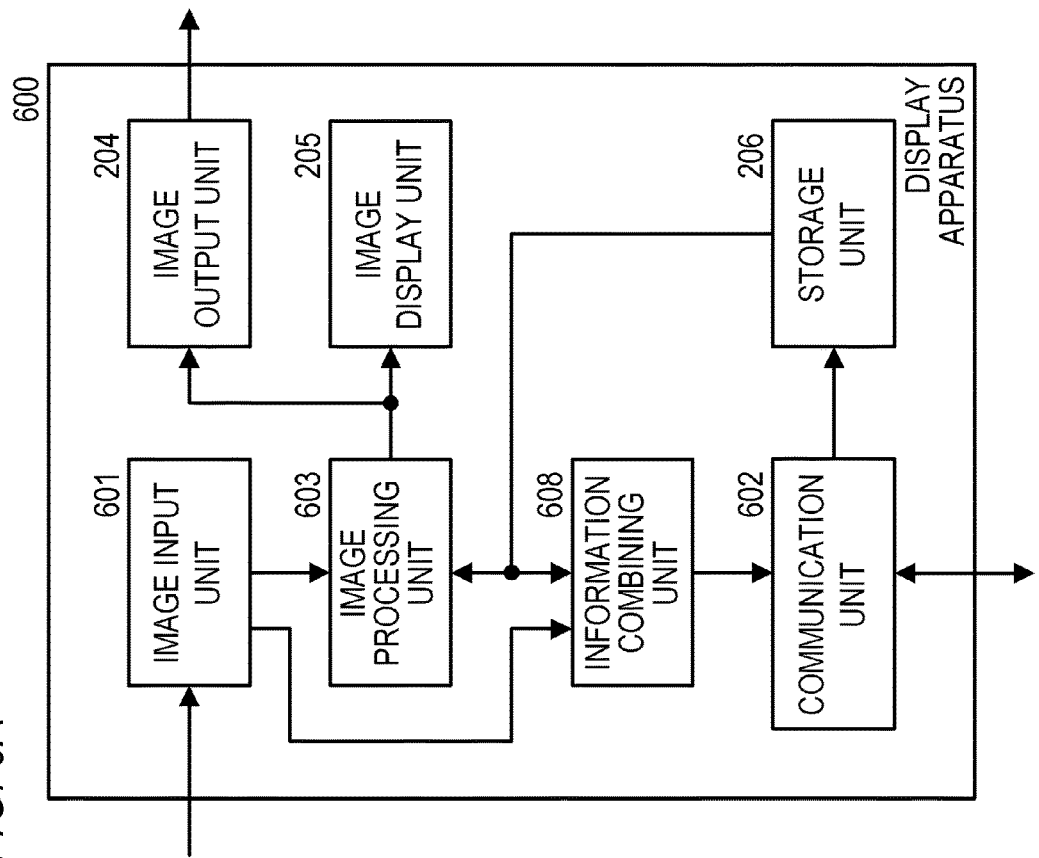

In the present embodiment, a display apparatus 600 shown in FIG. 8A is used in place of the display apparatus 200 and a display apparatus 700 shown in FIG. 8B is used in place of the display apparatus 300. FIG. 8A is a functional block diagram of the display apparatus 600, and FIG. 8B is a functional block diagram of the display apparatus 700. In FIG. 8A, same functional units as shown in FIG. 2B are assigned same reference characters as in FIG. 2B, and in FIG. 8B, same functional units as shown in FIG. 2C are assigned same reference characters as in FIG. 2C.

An image input unit 601 has a similar function to the image input unit 201 according to the first embodiment as well as a function for outputting input history information to an information combining unit 608.

The information combining unit 608 generates combined information by combining input history information output from the image input unit 601 and image processing information recorded in the storage unit 206. In addition, the information combining unit 608 outputs the generated combined information to a communication unit 602.

An image processing unit 603 has a similar function to the image processing units 203 and 303 according to the first embodiment. When input history information is not acquired by the image input unit 601, the image processing unit 603 adds image processing information (information including an identifier and a parameter) recorded in the storage unit 206 as output history information. When input history information is acquired by the image input unit 601, the image processing unit 603 generates and adds output history information similar to combined information. Alternatively, when input history information is acquired by the image input unit 601, the image processing unit 603 may use combined information as output history information without generating the output history information.

The communication unit 602 has a similar function to the communication unit 202 according to the first embodiment. Although input history information is output from the communication unit 202 to an external PC, combined information is output from the communication unit 602 to an external PC.

An image input unit 701 has a similar function to the image input unit 601, a communication unit 702 has a similar function to the communication unit 602, an image processing unit 703 has a similar function to the image processing unit 603, and an information combining unit 708 has a similar function to the information combining unit 608.

Process Flow of Display Apparatus 600

Figure 9:
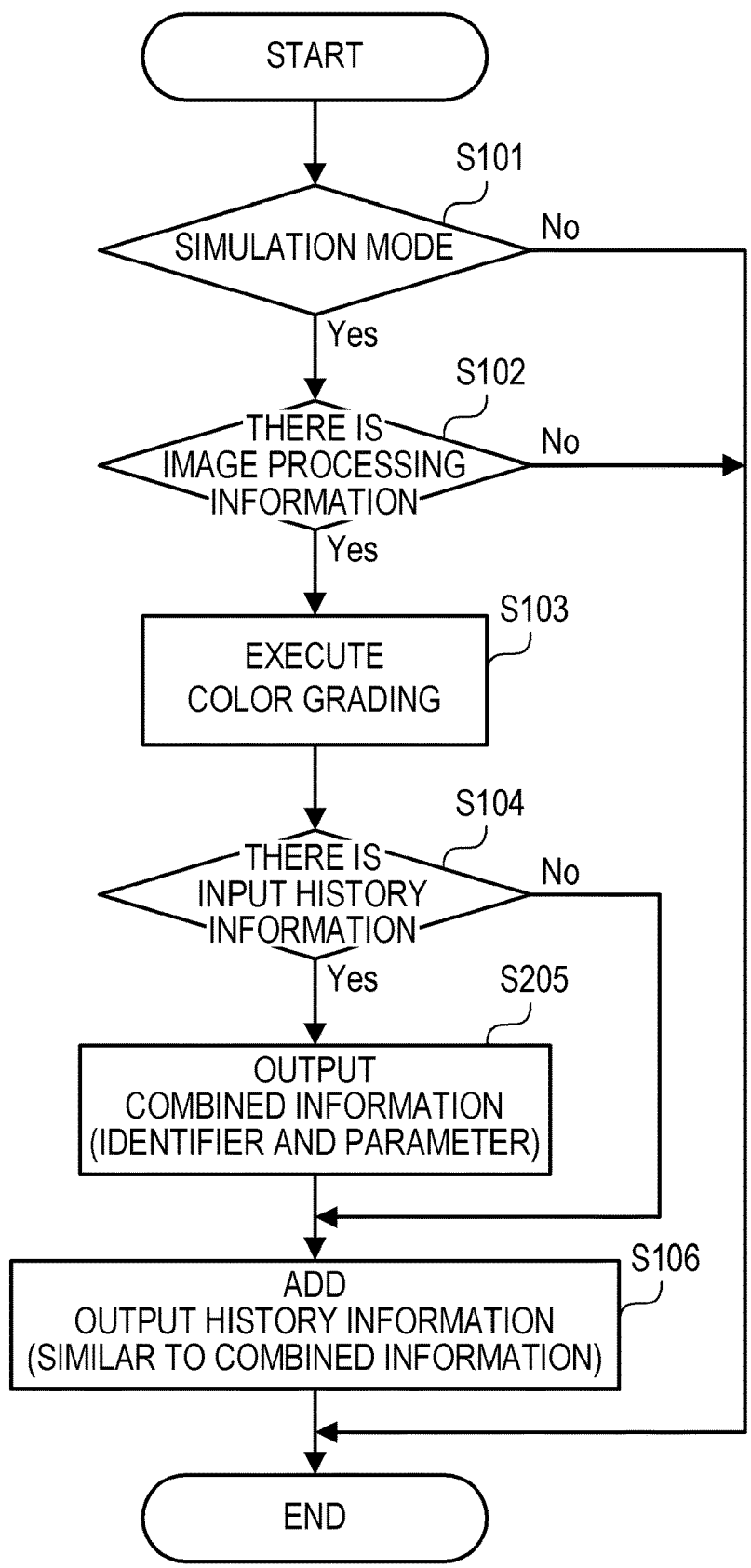
FIG. 9 is a flow chart showing a process flow according to the second embodiment.

An example of a process flow of the display apparatus 600 will be described with reference to FIG. 9. FIG. 9 is a flow chart showing a process flow of the display apparatus 600 and the display apparatus 700. The process flow shown in FIG. 9 is performed with respect to each frame of input image data. In FIG. 9, same processing steps as shown in FIG. 4 are assigned same reference characters as in FIG. 4.

Processes of S101 to S104 and S106 are performed in a similar manner to the first embodiment. In S106, the image processing unit 603 adds first image processing information (the information shown in FIG. 3A) to first processed image data as output history information.

Process Flow of Display Apparatus 700

An example of a process flow of the display apparatus 700 will be described with reference to FIG. 9.

Processes of S101 to S104 are performed in a similar manner to the first embodiment, and the process is advanced from S104 to S205. In S104, the image input unit 701 outputs the input history information (the information shown in FIG. 3A) added to the first processed image data to the information combining unit 708.

In S205, the information combining unit 708 generates combined information shown in FIG. 10 by combining the input history information (the information shown in FIG. 3A) from the image input unit 701 and the second image processing information (the information shown in FIG. 3B) recorded in the storage unit 306. In addition, the communication unit 702 outputs the combined information shown in FIG. 10 to the PC 500. As a result, the PC 500 stores the combined information shown in FIG. 10 as the recording history information. In the combined information shown in FIG. 10, the second image processing information is described after the first image processing information. The first image processing information includes an identifier and a parameter, and the second image processing information also includes an identifier and a parameter. Alternatively, the input history information from the image input unit 701 may be output to the PC 500. In addition, the PC 500 may generate and store recording history information similar to the combined information shown in FIG. 10 from the input history information and the second image processing information.

Subsequently, in S106, the image processing unit 703 generates output history information similar to the combined information shown in FIG. 10 from the input history information (the information shown in FIG. 3A) from the image input unit 701 and the second image processing information (the information shown in FIG. 3B) recorded in the storage unit 306. In addition, the image processing unit 703 adds the generated output history information to the second processed image data.

In the present embodiment, a similar effect to the first embodiment is obtained. Furthermore, according to the present embodiment, information including a parameter of each image processing is adopted as input history information, output history information, and recording history information. Accordingly, when reproducing previous image data, a parameter of each image processing can be readily comprehended and a work load on the user can be reduced.

Each functional unit according to the first and second embodiments may or may not be individual hardware. Functions of two or more functional units may be realized by common hardware. Each of a plurality of functions of a single functional unit may be realized by individual hardware. Two or more functions of a single functional unit may be realized by common hardware. In addition, each functional unit may or may not be realized by hardware. For example, an apparatus may include a processor and a memory storing a control program. Furthermore, functions of at least a part of the functional units included in the apparatus may be realized by having the processor read the control program from the memory and execute the control program.

It should be noted that the first and second embodiments are merely examples and that configurations obtained by appropriately modifying or altering the configurations of the first and second embodiments without departing from the spirit and scope of the present invention are also included in the present invention. Configurations obtained by appropriately combining the configurations of the first and second embodiments are also included in the present invention.

For example, a display apparatus may include a determining unit which determines, based on first image processing and second image processing, third image processing enabling the acquisition of a processing result similar to a processing result in a case where the first image processing and the second image processing are executed in this order of execution. In addition, information on the third image processing may be adopted as output history information and recording history information. Accordingly, previous image data can be reproduced by one image processing and a processing load can be reduced. In addition, since a reduction in user operations (designating a parameter and the like) is expected, a further reduction in a user's work load can be expected.

Let us now consider a case where the first image processing is a gradation conversion process using a one-dimensional LUT shown in FIG. 11A and the second image processing is a gradation conversion process using a one-dimensional LUT shown in FIG. 11B. In FIGS. 11A and 11B, an input value is a gradation value prior to conversion and an output value is a gradation value after conversion. In this case, based on a gradation conversion process using a one-dimensional LUT shown in FIG. 11C, a processing result which is similar to a processing result in a case where the first image processing and the second image processing are executed in this order of execution can be obtained. Therefore, the gradation conversion process using the one-dimensional LUT shown in FIG. 11C is determined as the third image processing and the one-dimensional LUT shown in FIG. 11C and the like are adopted as output history information and recording history information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-140586, filed on Jul. 20, 2017, which is hereby incorporated by reference herein in its entirety.

What is claimed is:
1. An image processing apparatus, comprising:
an acquiring unit configured to acquire information on first image processing performed on input image data;
a processing unit configured to generate processed image data by performing second image processing on the input image data; and
an outputting unit configured to output the information on the first image processing acquired by the acquiring unit, information on the second image processing performed by the processing unit, and information regarding an order of execution of the first image processing and the second image processing either as a single piece of information or individual pieces of information, wherein
the information on the first image processing and the information on the second image processing respectively include a parameter of a type defined in the ASC CDL.

2. The image processing apparatus according to claim 1, wherein
the information on the first image processing and the information on the second image processing respectively include a parameter regarding at least any of slope, offset, and power, as defined in the ASC CDL.

3. The image processing apparatus according to claim 1, wherein
the acquiring unit acquires, from an external image processing apparatus having generated the input image data by performing the first image processing on original image data, the input image data and the information on the first image processing.

4. The display apparatus according to claim 3, wherein
the information on the first image processing has been added to the input image data, and
the acquiring unit acquires the information on the first image processing from the input image data.

5. The image processing apparatus according to claim 3, wherein
the acquiring unit acquires, from the external image processing apparatus, the input image data and the information on the first image processing via a serial digital interface (SDI) cable.

6. The image processing apparatus according to claim 1, wherein
a plurality of image processing have been sequentially performed on the input image data,
the acquiring unit acquires the information on the plurality of image processing and the information regarding an order of execution of the plurality of image processing either as a single piece of information or individual pieces of information, and
the outputting unit outputs the information on the plurality of image processing, information on the second image processing, and information regarding an order of execution of the plurality of image processing and the second image processing either as a single piece of information or individual pieces of information.

7. The display apparatus according to claim 1, wherein
the information on the first image processing further includes an identifier of the first image processing, and
the information on the second image processing further includes an identifier of the second image processing.

8. The display apparatus according to claim 1, wherein
the outputting unit:
generates output image data by adding to the processed image data the information on the first image processing, the information on the second image processing, and the information regarding an order of execution of the first image processing and the second image processing either as a single piece of information or individual pieces of information; and
outputs the output image data.

9. The image processing apparatus according to claim 1, further comprising a display unit configured to display an image, based on the processed image data generated by the processing unit.

10. An image processing apparatus, comprising:
an acquiring unit configured to acquire, from an external image processing apparatus having generated input image data by performing first image processing on original image data, the input image data and information on the first image processing;
a processing unit configured to generate processed image data by performing second image processing on the input image data; and
an outputting unit configured to output the information on the first image processing acquired by the acquiring unit, information on the second image processing performed by the processing unit, and information regarding an order of execution of the first image processing and the second image processing either as a single piece of information or individual pieces of information.

11. An image processing method, comprising:
an acquiring step of acquiring information on first image processing performed on input image data;
a processing step of generating processed image data by performing second image processing on the input image data; and
an outputting step of outputting the information on the first image processing acquired in the acquiring step, information on the second image processing performed in the processing step, and information regarding an order of execution of the first image processing and the second image processing either as a single piece of information or individual pieces of information, wherein
the information on the first image processing and the information on the second image processing respectively include a parameter of a type defined in the ASC CDL.

12. An image processing method, comprising:
an acquiring step of acquiring, from an external image processing apparatus having generated input image data by performing first image processing on original image data, the input image data and information on the first image processing;
a processing step of generating processed image data by performing second image processing on the input image data; and
an outputting step of outputting the information on the first image processing acquired in the acquiring step, information on the second image processing performed in the processing step, and information regarding an order of execution of the first image processing and the second image processing either as a single piece of information or individual pieces of information.

* * * * *